May 15, 1923.
D. PEPPER
ELECTRIC BATTERY
Filed Aug. 9, 1921
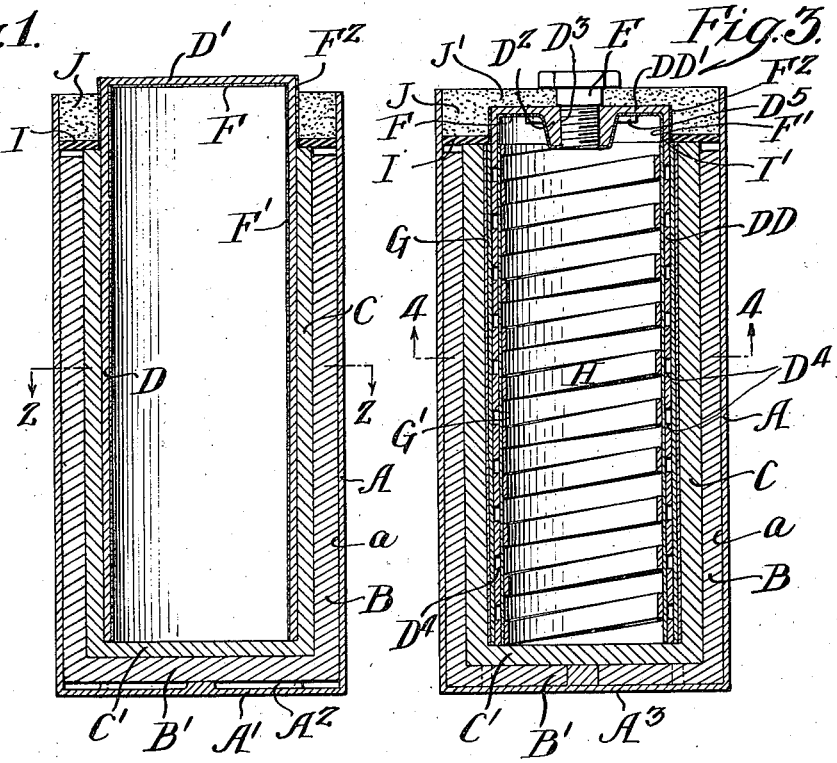
INVENTOR.
David Pepper.
BY
his ATTORNEY.

Patented May 15, 1923.

1,454,943

UNITED STATES PATENT OFFICE.

DAVID PEPPER, OF PHILADELPHIA, PENNSYLVANIA.

ELECTRIC BATTERY.

Application filed August 9, 1921. Serial No. 490,858.

*To all whom it may concern:*

Be it known that I, DAVID PEPPER, a citizen of the United States of America, residing in the city and county of Philadelphia, in the State of Pennsylvania, have invented a certain new and useful Improvement in Electric Battery, of which the following is a true and exact description, reference being had to the accompanying drawing, which forms a part thereof.

My invention relates to electric batteries and has for its object to provide a battery of high voltage and simple and effective construction, especially, though not exclusively, adapted for use as a flashlight battery.

The nature of my invention will be best understood as described in connection with the drawings in which it is illustrated and in which—

Figure 1 is a sectional elevation of a battery embodying my invention.

Figure 2 is a cross-section on the line 2—2 of Fig. 1.

Figure 3 is a sectional elevation of a modified and preferred construction of my battery and Figure 4 is a cross-section on the line 4—4 of Fig. 3 looking upward.

A is a thin walled cup of lead or lead-antimony alloy which may have its bottom A' strengthened by ribs as shown at $A^2$ or may have a plain flat bottom, as shown at $A^3$ in Fig. 3. By preference, the walls $a$ of the cup A have a thin layer of electrode-posited lead peroxide deposited on them before the layer of lead peroxide and a suitable binder, indicated at B, is applied to them. This peroxide layer B, or its equivalent similarly applied, constitutes the cathode of my battery. Inside of the cathode layer I provide a separator layer C of some material permeable to the electrolyte used which may be dilute sulphuric acid or bisulphate of soda or potash, in either liquid or jelly or paste form.

D, Figs. 1 and 2, is a zinc cup having a closed end D' which is set in the centre of the battery with the closed end uppermost and which constitutes the anode of my battery. The closed top zinc cup is greatly strengthened by its closed top and constitutes an important feature of my invention. Where the zinc cup is used with a peroxide of manganese and carbon cathode layer B the zinc need not be amalgamated, but where used with peroxide of lead as a cathode the zinc cup should have its active surface amalgamated or may be amalgamated throughout and in the construction of Figs. 1 and 2 where only the outer face of the zinc cup is active I have shown the cup reinforced by a layer of asphalt or similar material indicated at F'. At $F^2$, at the top of the cup, I have also shown a layer of asphalt which protects this nonactive portion from amalgamation and serves to make a better joint with the asphalt plug J which closes the top of the battery and holds the zinc cup in position. I is a washer on top of which the plug J is formed. In the construction of Figs. 1 and 2 the electrolyte is charged into the battery before the plug J is formed and of course impregnates the layer C.

In the modified battery of Figs. 3 and 4 the zinc cup DD is formed with strengthening ribs $D^3$ extending across its top end with a perforated boss $D^2$ through which the electrolyte is introduced and which is closed by a plug E forming one of the connections. The cup DD is formed with perforations as indicated at $D^4$.

In the construction of Figs. 3 and 4, I apply to the inner and outer walls of the cup DD a layer of paper as indicated at G and G' on which has been applied a thin layer of zinc amalgam. This amalgam of course as it is reduced liberates mercury which immediately acts to amalgamate the wall of the cup which is thus maintained in condition to form an effective anode. At H I have shown a spring of stiff paper the function of which is to hold the paper layer G in contact with the inner wall of the zinc cup.

In Fig. 3 I have shown the asphalt plug J as extending over the top of the cup DD as shown at J'.

Having now described my invention, what I claim as new and desire to secure by Letters Patent is—

1. An electric battery comprising an outer cup shaped container of lead, a layer of active material in close electrical and mechanical contact with the inside walls of said cup constituting the cathode of the battery, a zinc cup shaped anode set with its closed end uppermost in the battery and spaced from the cathode layer, a seal of non-permeable non-conducting material closing the space between the top of the lead and zinc cups and acting to hold the zinc cup anode in position, and an electrolyte in contact with both electrodes.

2. An electric battery comprising an outer cup shaped container of lead having a layer of lead peroxide electro-deposited on its inner walls and an inner layer of lead peroxide compacted in close electrical and mechanical contact with the so prepared inner wall of the lead cup and constituting the cathode of the battery, a zinc cup shaped anode having the active portions of its walls amalgamated, set with its closed end uppermost in the battery and spaced from the cathode layer, a seal of non-permeable, non-conducting material closing the space between the top of the lead and zinc cups and acting to hold the zinc cup anode in position and an electrolyte in contact with both electrodes.

3. An electric battery comprising an outer cup shaped container of lead, a layer of active material in close electrical and mechanical contact with the inside walls of said cup constituting the cathode of the battery, a zinc anode held centrally in the battery, layers of zinc amalgam applied in contact with active surface of zinc anode, means for holding the amalgam in position, an electrolyte in contact with both anode and cathode and a seal closing the top of the battery and spacing the zinc anode therein.

4. An electric battery comprising an outer cup shaped container of lead, a layer of active material in close electrical and mechanical contact with the inside walls of said cup constituting the cathode of the battery, a zinc cup shaped anode set with the closed end uppermost in the battery and spaced from the cathode layer, a reinforcing layer of inert material applied to the non-active surfaces of the zinc cup anode, a seal of non-permeable non-conducting material closing the space between the top of the lead and zinc cups and acting to hold the zinc cup anode in position and an electrolyte in contact with both electrodes.

DAVID PEPPER.